(12) United States Patent
Niino et al.

(10) Patent No.: US 7,270,877 B2
(45) Date of Patent: Sep. 18, 2007

(54) PROTECTIVE TAPE USED FOR OPTICAL MEMBER

(75) Inventors: Takuya Niino, Ibaraki (JP); Shozo Imono, Ibaraki (JP); Kazuhito Okumura, Ibaraki (JP); Kenji Sano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 96 days.

(21) Appl. No.: 10/763,977

(22) Filed: Jan. 23, 2004

(65) Prior Publication Data

US 2004/0151903 A1     Aug. 5, 2004

(30) Foreign Application Priority Data

Jan. 27, 2003    (JP)    ............................. 2003-017040

(51) Int. Cl.
*C09J 7/02*    (2006.01)

(52) U.S. Cl. .................. 428/354; 428/40.1; 428/343; 428/355 AC; 428/480

(58) Field of Classification Search ............... 428/40.1, 428/343, 354, 355 AC, 480
See application file for complete search history.

(56) References Cited

U.S. PATENT DOCUMENTS

| | | | | |
|---|---|---|---|---|
| 4,241,198 | A | 12/1980 | Kobayashi | |
| 6,899,949 | B2 * | 5/2005 | Imono et al. | 428/354 |
| 2003/0219592 | A1 * | 11/2003 | Imono et al. | 428/352 |
| 2004/0151903 | A1 * | 8/2004 | Niino et al. | 428/354 |

FOREIGN PATENT DOCUMENTS

| | | |
|---|---|---|
| JP | 57-207646 | 12/1982 |
| JP | 4-30120 | 2/1992 |
| JP | 9-87594 | 3/1997 |
| JP | 9-87595 | 3/1997 |
| JP | 9-113726 | 5/1997 |
| JP | 11-256115 | 9/1999 |
| JP | 11-256116 | 9/1999 |
| JP | 2000-98902 | 4/2000 |
| JP | 2000-212304 | 8/2000 |
| JP | 2001-202021 | 7/2001 |
| JP | 2002-91313 | 3/2002 |
| JP | 2002-264548 | 9/2002 |
| JP | 2002-268554 | 9/2002 |

OTHER PUBLICATIONS

Japanese Patent Abstract 09-113726.*

* cited by examiner

*Primary Examiner*—Daniel Zirker
(74) *Attorney, Agent, or Firm*—Knobbe Martens Olson & Bear, LLP

(57) ABSTRACT

A protective tape used for optical member comprising a plastic film base, a pressure-sensitive adhesive layer formed on one side of the plastic film base and a treated layer formed on an opposite side of the plastic film base, wherein the treated layer has a structure in which a copolymer (A) including (a) an alkyl (meth)acrylate having an alkyl group with carbon numbers of 8 to 20; (b) (meth)acrylonitrile; and (c) a monomer having functional groups copolymerizable with the component (a) and the component (b), as copolymerization components, is cross-linked by a cross-linking agent. The protective tape used for optical member is enabled to direct print with an ink on the treated layer and have a low adhesive property with the pressure-sensitive adhesive applied to an optical film and have a solvent resistance.

7 Claims, 1 Drawing Sheet

PROTECTIVE TAPE USED FOR OPTICAL MEMBER

BACKGROUND OF THE INVENTION

1. Field of the Invention

The present invention relates to a protective tape used for optical member. Furthermore, it relates to a treated layer forming agent used for protective tape used for optical member. The protective tape used for optical member of the invention is used for protection of a surface of various optical films, such as polarizing plates and retardation plates. The protective tape is used for protection of liquid crystal displays to attach on a surface of a liquid crystal display panel, and is used for protection of various kinds of image viewing displays, such as organic electroluminescence displays, PDPs, and etc.

2. Prior Art

Protective tape used for optical member has plastic film bases, such as polyethylene terephthalate and polyethylene, and have pressure-sensitive adhesive layers applied to the base. The protective tape used for optical member is attached on materials to be protected via a pressure-sensitive adhesive layer, and protects the materials to be protected from blemish, contamination, etc. For example, as optical materials to be protected, optical films, such as polarizing plates and retardation plates, may be mentioned (Japanese Patent Publication Ser. No. Hei 4-30120; Japanese Patent Publication Ser. No. Hei 9-113726: Japanese Patent Publication Ser. No. Hei 11-256115: and Japanese Patent Publication Ser. No. Hei 11-256116).

The above-mentioned protective tape protects one side of the optical film during various manufacturing processes. On the other hand, pressure-sensitive adhesive layer, such as acrylic based pressure-sensitive adhesive, is formed onto an opposite side of the optical film. Furthermore, the pressure-sensitive adhesive layer is covered with a release liner. Subsequently, the optical film with the protective tape is cut and processed according to a size of a liquid crystal cell. In addition, printing in ink is given to a backside (opposite side of the pressure-sensitive adhesive layer of the protective tape) of a base of the above-mentioned protective tape in order to enable distinction for various intended uses. And the optical film with protective tape is piled up, and stored.

Then, after various production processes or inspection, a release liner of the optical film with the protective tape is released, and, subsequently the optical film is attached to a liquid crystal cell. Then, the above-mentioned protective tape is released and is removed in a stage where protection of a surface for an optical film is not required, for example, a state immediately before a liquid crystal panel is built into a personal computer.

As a method of releasing a protective tape, a method may be often adopted in which a commercially available cellophane pressure-sensitive adhesive tape is attached on a corner of a protective tape, then the tape is vertically pulled up, and thereby the surface protective tape is released together with the tape. This is because that this method has a large effect of preventing damage or releasing in a corner of an optical film in comparison with a method of directly releasing protective tape by hand.

SUMMARY OF THE INVENTION

In the optical film with the above-mentioned protective tape, when they are piled up after cutting processing, there is a possibility that pressure-sensitive adhesives over flown from a cut surface may adhere to the surrounding protective tapes. Therefore, a treated layer (antifouling layer) comprising releasing agent etc. is formed on a backside of the protective tape base so that blocking of the optical film with the protective tape may not given. However, a treated layer formed on the backside makes difficult direct printing onto the treated layer by ink for discrimination of intended uses. In conventional methods, by such reason, a portion to be printed in the treated layer was once wiped off with solvents, such as ethanol, hexane or ethyl acetate, to make the portion clean, and then printing was given to an exposure plastics surface. On the other hand, if the treated layer is designed so that a direct printing to the treated layer may be enabled, inevitably, the treated layer concerned will have good adhesive property with pressure-sensitive adhesives over flown from a cut surface, as a result, leading to occurrence of blocking. Moreover, pressure-sensitive adhesives attached to the protective tape is wiped off with solvents, such as ethanol, hexane or ethyl acetate, at the time of visual inspection. There were such defects that poor solvent resistance of the treated layer caused whitening of the treated layer, and removed the treated layer, leading to resulting deterioration of optical characteristics.

The invention aims at providing an protective tape used for optical member having a pressure-sensitive adhesive layer formed on one side of a plastic film base and having a treated layer formed on an opposite side of the plastic film base that is enabled to direct print with an ink on the treated layer and have a low adhesive property with the pressure-sensitive adhesive applied to an optical film and have a solvent resistance.

And the invention also aims at providing a treated layer forming agent used for the above-mentioned protective tape used for optical member. Furthermore, the invention aims at providing an optical film with the protective tape used for optical member to which the above-mentioned protective tape used for optical member is attached, and an image viewing display with the protective tape used for optical member.

As a result of wholehearted research in order to attain the above-mentioned purpose performed by the present inventors, it was found out that the above-mentioned subject might be attained by protective tape used for optical member shown below, to completion of the invention That is, the present invention is concerned to a protective tape used for optical member: comprising a plastic film base, a pressure-sensitive adhesive layer formed on one side of the plastic film base and a treated layer formed on an opposite side of the plastic film base, wherein the treated layer has a structure in which a copolymer (A) including (a) an alkyl (meth)acrylate having an alkyl group with carbon numbers of 8 to 20;

(b) (meth)acrylonitrile; and (c) a monomer having functional groups copolymerizable with the component (a) and the component (b), as copolymerization components, is cross-linked by a cross-linking agent.

The above-mentioned protective tape used for optical member, the component (c) is preferably a monomer having a carboxyl group.

The above-mentioned protective tape used for optical member, the plastic film is preferably a polyester film.

And the present invention is concerned to a treated layer forming agent used for protective tape used for optical member: comprising a copolymer (A) including (a) an alkyl (meth)acrylate an alkyl group with carbon numbers of 8 to 20;

(b) (meth)acrylonitrilec; and (c) a monomer having functional groups copolymerizable with the component (a) and the component (b), as copolymerization components, and a cross-linking agent.

Moreover the present invention is concerned to an optical film with a protective tape, wherein the above-mentioned protective tape used for optical member attached on the optical film. And the present invention is concerned to an image viewing display with a protective tape, wherein the above-mentioned protective tape used for optical member attached on the image viewing display.

In a treated layer of the above-mentioned protective tape used for optical member, a long chain alkyl based release agent comprising a copolymer (A) that includes the above-mentioned components (a), (b), and (c) as copolymerization components is cross-linked with a cross-linking agent. (Meth)acrylonitrile, as a component (b) in the copolymer (A), improves a file strength and adhesion of the treated layer. Moreover, a monomer, as a component (c) in the copolymer (A), including functional groups can improve ink fixability of the treated layer, and also enables printing without repelling of an ink in a printing process with stamping inks and ink jet onto the treated layer. Particularly, as a component (c), a monomer having carboxyl group is preferable. Therefore, in the treated layer on a base backside, even without wiping and cleaning with solvents, direct printing with inks onto the treated layer surface is enabled. Besides, functional groups of the component (c) are cross-linked in the copolymer (A) to give a cross-linked structure to the treated layer, and then the crossed-linked structure can demonstrate solvent resistance in adhesive wiping during visual inspection, leading to suppression of omission and whitening by dissolution of the treated layer.

Therefore, colored ink realizing easy discrimination by the naked eyes as an indentification method may be easily printed by a stamping and an ink jet method onto the treated layer according to various kinds of optical intended uses, such as optical films as polarizing plates and retardation plates, and liquid crystal display panels. Moreover, the above-mentioned treated layer maintains release property, shows a low adhesive property with acrylic based pressure-sensitive adhesives applied to optical films, thereby hardly causing a blocking problem even when piled up as an optical film with a protective tape. Morever, even when a pressure-sensitive adhesive overflowed from a cutting plane adheres to a protective tape, since the treated layer has solvent resistance, wiping off of the pressure-sensitive adhesive with solvents at the time of visual inspection may not cause degradation of optical characteristics by dissolution of the treated layer.

Besides, the above-mentioned treated layer has a certain level of adhesive property with cellophane pressure-sensitive adhesive tape. Therefor, in a protective tape used for optical member of the invention, in following production processes, cellophane pressure sensitive adhesive tape used may be easily released, and thus good performance is shown also in picking up property with cellophane pressure-sensitive adhesive tape from materials to be protected.

DESCRIPTION OF THE PREFERRED EMBODIMENTS

Figure 1:
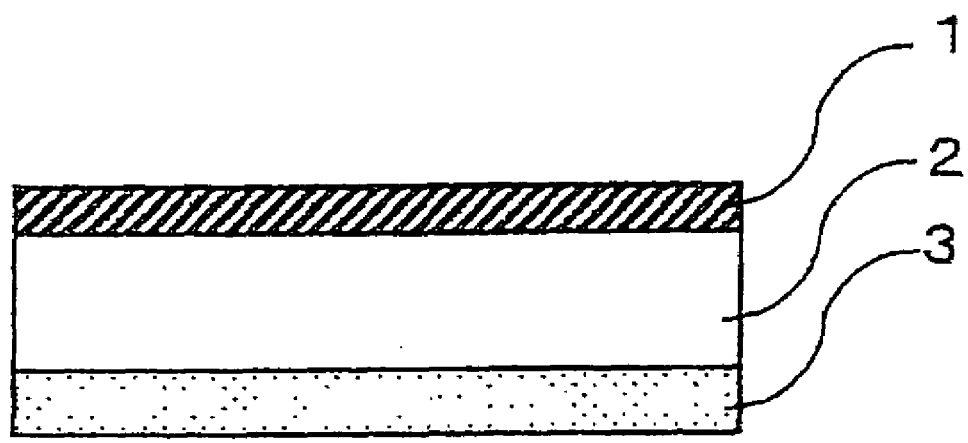
FIG. 1 shows a sectional view of a protective tape used for optical member of the invention.

Hereafter, description will be given about a protective tape used for optical member of the invention with reference to drawings. A protective tape used for optical member of the invention has a pressure-sensitive adhesive layer 3 on one side of a plastic film base 2, and has a treated layer 1 on an opposite side, as shown in FIG. 1. Moreover, a protective tape used for optical member of the invention may be used as a sheet-like material.

As plastic film base 2, base conventionally ued for protective tape use for optical members may be used without opecial limitation. As film materials, in general, in the light of easiness in inspection of optical films by fluoroscopy and management, for example, there may be mentioned transparent films such as polyester based resins, cellulose based resins, acetate based esins, polyether sulfone based resins, polyimide based resins, polyokefin based resins, and acrylic based. Amonfg them, polyester based resins are polyolefin based resins, and acrylic based resins. Among them, polyester based resins are preferable. The film base may be used as laminated materials of one kind or two or more kinds of film materials, and moreover stretched materials of the above-mentioned films may also be used. In general, a thickness of the plastic film base 2 is 500 μm or less, and preferably in a range of 10 through 200 μm.

Although any pressure-sensitive adhesives, such as acrylic based, synthetic rubber based, rubber material based, and silicone based, may be used as pressure-sensitive adhesives for formation of the pressure-sensitive adhesive layer 3, acrylic based pressure-sensitive adhesives comprising acrylic based polymers as a base polymer are preferable in the light of, such as fluoroscopic property, weatherability, and heat resistance. A weight-average molecular weight of the acrylic based polymer, is preferably approximately 300,000 through 2,500,000.

Various alkyl (meth)acrylates may be used as monomers used for the acrylic based polymers. For example, there may be mentioned: alkyl (meth)acrylates (for example, alkyl esters with carbon numbers of 1 through 20, such as methyl ester, ethyl ester, propyl ester, butyl ester, 2-ethyl hexyl ester, isooctyl ester, isononyl ester, isodecyl ester, dodecyl ester, lauryl ester, tridecyl ester, pentadecyl ester, hexadecyl ester, heptadecyl ester, octadecyl ester, nonadecyl ester, and icosyl ester), and they may be used or two or more of them may be used in combination.

In order to give polarity to acrylic based polymers obtained, monomers comprising carboxyl groups, such as (meth)acrylic acid and itaconic acid; monomers comprising hydroxyl groups, such as hydroxyethyl (meth)acrylate and hydroxypropyl (meth)acrylate; monomer comprising amide groups, such as N-methylol acrylamide; monomers comprising cyano groups, such as (meth)acrylonitrile; monomers comprising epoxy groups, such as glycidyl (meth)acrylate; vinyl esters, such as vinyl acetate; and styrene based monomers, such as styrene and α-methyl styrene etc. may be used as copolymer monomers with the above-mentioned alkyl (meth)acrylates.

Moreover, polymerization method of the acrylic based polymer is not especially limited, and well-known polymerization methods, such as a solution polymerization, an emulsion polymerization, a suspension polymerization, and a UV polymerization, may be adopted.

Cross-linking agent may be comprised in the above-mentioned pressure-sensitive adhesives. As cross-linking agents, polyisocyanate compounds, polyamine compounds, melamine resins, urea resins, epoxy resins, etc. may be mentioned. Furthermore, tackifiers, plasticizers, fillers, antioxidants, UV absorbents, silane coupling agents, etc. may also be used suitably, if needed to the above-mentioned pressure-sensitive adhesives.

Formation method of the pressure the pressure-sensitive adhesive layer 3 is not especially limited, and there may be mentioned methods, such as: (a transfer method) in which a pressure-sensitive adhesive is applied onto a release liner, and a pressure-sensitive adhesive layer formed is transferred to the film base 2 after the pressure-sensitive adhesive layer is dried; and (a direct method) in which a pressure-sensitive adhesive is directly applied onto the film base 2, and then dried. A thickness (a film thickness in a dried state) of the pressure-sensitive adhesive layer 3 is determined according to a pressure-sensitive adhesive strength needed. The thickness is usually approximately 1 through 100 µm, and preferably 5 through 50 µm.

A treated layer 1 is formed of a treated layer forming agent comprising a copolymer (A) including (a) an alkyl (meth)acrylate an alkyl group with carbon numbers of 8 to 20; (b) acrylonitrile; and (c) a monomer having functional groups copolymerizable with the above-mentioned components (a) and (b), as copolymerization components, and a cross-linking agent. The treated layer 1 has a structure wherein the copolymer (A) is cross-linked with the cross-linking agent.

Alkyl (meth)acrylate (a) having an alkyl group with carbon numbers of 8 to 20 is a monomer conventionally used for long chain alkyl based release agent (copolymer). Carbon numbers of the alkyl group of 7 or less provides inconvenience to releasability. Carbon numbers of 21 or more makes film strength weak. As long chain alkyl groups having carbon numbers of 8 to 20, an octyl group, a nonyl group, a decyl group, an undecyl group, a dodecyl group, a hexadecyl group, an octadecyl group, an eicosyl group, etc. may be mentioned.

As monomers (c) having a functional group, monomers that react with cross-linking agents to form cross-link structure may be used without particular limitation. As the functional groups, a carboxyl group, a hydroxyl group, an epoxy group, an amide group, etc. may be mentioned. Among the functional groups, carboxyl group is preferable. As monomers having a carboxyl groups, (meth)acrylic acid, maleic acid, itaconic acid, etc. may be mentioned. The monomers having carboxyl groups may be anhydrides thereof.

A percentage of the component (a) and component (b) (a molar ratio of monomer units in the formed polymer) is preferably component (a)/component (b)=5/95 to 40/60, and more preferably 10/90 to 20/80. On one hand, a small amount of (meth)acrylonitrile as component (b) tends to deteriorate a film strength, and on the other hand, a large amount thereof tends to worsen wiping property of pressure-sensitive adhesives.

A percentage (a molar ratio of monomer units in the formed polymer) to be used of the component (c) may be adjusted to a sum total of the component (a) and the component (b). Preferably, sum total of (component (a)+component (b))/component (c)=100/20 to 100/60, and more preferably 100/30 to 100/50. On one hand, a small amount of monomers as the components (c) having functional groups tends to worsen printing property, and to provide inadequate cross-linking by a cross-linking agent, leading to tendency of degradation of solvent resistance. On the other hand, a large amount thereof tends to reduce wiping property of the resulting pressure-sensitive adhesive.

In addition, other monomers may further be copolymerized to the copolymer (A) in a range not impairing releasability of the copolymer (A) etc. The copolymer (A) may be prepared by same polymerizing methods as methods for the above-mentioned acrylic polymer.

A weight average molecular weight (GPC) of the copolymer (A) is preferably approximately 10,000 to 150,000, and more preferably 30,000 to 100,000. A molecular weight of 10,000 or less tends to reduce formation of releasing film, and a molecular weight exceeding 150,000 worsens solubility of the resulting copolymer (A), leading to possible occurrence of problems in workability.

As cross-linking agents, according to the functional group as the component (c) cross-linking agents that have at least two functional groups having reactivity with the functional group may be used. In the case where the component (c) is a monomer including carboxyl groups, as cross-linking agents, polyisocyanate compounds, polyamine compounds, melamine resins, urea resins, epoxy resins, etc. may be mentioned. In th light of adhesive property to a base material of th treated layer, polyisocyanate compounds may be suitably used as cross-linking agents. Although an amount of the cross-linking agent to be used is not especially limited, it is usually approximately 1 to 50 parts by weight to the copolymer (A) 100 parts by weight, and preferably 10 to 20 parts by weight.

The above-mentioned treat agent is diluted with solvents, such as toluene, ethyl acetate, and methyl ethyl ketone, and, subsequently is applied to a plastic film base 2, using a smoothing bar, a photogravure coater, an offset coater, etc. A coated amount after dried of the treated layer 1 formed on the plastic film base is usually 0.003 through 2 $g/m^2$, and preferably 0.005 through 1 $g/m^2$.

A method for manufacturing a protective tape used for optical member of the invention is not especially limited, but well-known means may be suitably adopted. For example, a method may be mentioned where treat agent is applied onto one surface of a plastic film base 2, then dried in a heated oven to form a treated layer 1, and subsequently a pressure-sensitive adhesive layer 3 is formed on an opposite surface of the plastic film base 2 using the above-mentioned means, and finally rolled up on a core.

EXAMPLES

Although still more detailed description will be given to below for a protective tape used for optical member of the invention with referenc to Examples, the invention is not limited to them.

Example 1

(Preparation of a Treated Layer Forming Agent)

As a copolymer (A), a copolymer of octadecyl methacrylate, acrylonitrile, and methacrylic acid (a molar ratio: octadecyl methacrylate/acrylonitrile/methacrylic acid=18/82/35, a weight average molecular weight 70,000) was used. Trimethylol propane tolylene diisocyanate (manufactured by NIPPON POLYURETHANE INDUSTRY CO., LTD. COLLONATE: 15 parts by weight expressed in terms of solid content) was blended, as a cross-linking agent, with a toluene solution (100 parts by weight, expressed in terms of solid content) of the copolymer (A) concerned to obtain a 0.7% toluene solution of a treated layer forming agent.

(Preparation of a Pressure-Sensitive Adhesive Used for a Protective Tape Used for Optical Member)

Trimethylolpropane tolylene diisocyanate 3 parts by weight expressed in terms of solid was added to a 25% ethyl acetate solution of an acrylic based polymer comprising 2-ethyl hexyl acrylate, methylmethacrylate, and 2-hydroxyethyl acrylate (weight ratio: 68/29/3, weight-average molecular weight 400,000) at a ratio to the above-mentioned acrylic based polymer 100 parts by weight, and mixed to prepare an acrylic based pressure-sensitive adhesive composition.

(Preparation of a Protective Tape Used for Optical Member)

The above-mentioned treat agent was applied on one side of a polyethylene terephthalate film with a thickness of 38 µm to give an applied amount after dried of 0.04 g/m$^2$, using a Mayer bar, and dried for 1 minute at 120° C. to form a treated layer. Subsequently, the above-mentioned acrylic based pressure-sensitive adhesive composition was applied onto an opposite side of th etreated layer on the above-mentioned polyethylene terephthalate film to give a thickness after dried of 15 µm using an applicator, and then dried for 2 minutes at 120° C. to form a pressure-sensitiove adhesive layer, and thus an protective tape used for optical member was obtained.

Comparative Example 1

Except for having used only the copolymer (A) and not having used the cross-linking agent in preparation of a treated layer forming agent of Example 1, a same method as in Example 1 was repeated to prepare a treated layer forming agent. And then a protective tape used for optical member was obtained as in Example 1.

Comparative Example 2

Except for having used a copolymer (a molar ratio: octadecyl methacrylate/acrylonitrile =20/80, a weight average molecular wight 70,000) of octadecyl methacrylate and acrylonitrile instead of the copolymer (A), and not having used the cross-linking agent in preparation of a treated layer forming agent of Example 1, a same method as in Example 1 was repeated to prepare a treated layer forming agent. And a protective tape used for optical member was obtained as in Example 1.

Comparative Example 3

In Example 1 (preparation of a protective tape used for optical member), except for not having performed formation of a treated layer, same method as in Example 1 was repeated, and a protective tape used for optical member was obtained.

The protective tape used for optical members obtained in Examples and Comparative examples were evaluated for following characteristics. All measurements were carried out under ambient atmosphere of 23° C. and 65% RH. Table 1 shows results.

Evaluation Item and Evaluation Method (1) Printing Property of a Treated Layer

Printing was performed to a treated layer of a protective tape used for optical member using commercially available oily ink stamp [a product manufactured by Shachihata Inc., quick-drying X stamper: red, and blue], and Ink jet [a product manufactured by Video Jet Technologies Japan Inc. EXCEL series 170i, ink: red (16-8460), and blue (16-7900)]. Evaluation was given using five-point method, as following criteria.

Point 5—Excellent, no ink repellence
Point 1—Poor, much ink repellence observed (2) Adhesive Strength to an Acrylic Based Pressure-Sensitive Adhesive of a Treated Layer 1) Trimethylolpropane tolylene diisocyanate 1.5 parts by weight was added to a 30% ethyl acetate solution of an acrylic based polimer of butyl acrylate/acryl acid (weight ratio: 100/3, weight-average molecular weight 300,000) to the above-mentioned acrylic based polymer 100 parts by weight expressed in terms of solid, and mixed to prepare an acrylic based pressure-sensitive adhesive composition.

2) The above-mentioned acrylic based pressure-sensitive adhesive composition was applied on a polyethylene terephthalate film with a thickness of 75 µm so as to give a thickness after dried of 40 µm, dried for 3 minutes at 130° C. to form a pressure-sensitive adhesive layer. A release liner was attached on this pressure-sensitive adhesive material layer, and a test sample for adhesive power measurement of the treated layer (pressure-sensitive adhesive sheet) was prepared.

3) A side opposite to the acrylic pressure-sensitive adhesive side of the above-mentioned sample (polyethylene terephthalate film side) was attached onto a SUS board using double-stick tape No. 500 by NITTO DENKO CORP.

4) A polyethylene terephthalate film with a thickness of 25 µm was attached to the pressure-sensitive adhesive layer of the protective tape used for optical member (50 mm width) (so as not to disturb adhesive power measurement of the treated layer to the acrylic based pressure-sensitive adhesive), and a treated layer of the protective tape used for optical member was attached on a side of the acrylic pressure-sensitive adhesive of the sample made in 3). 5) The sample was kept to stand for 30 minutes after attached, and subsequently, the protective tap used for optical member was 180-degree peeled at a rate of 0.3 m/minute to obtain an adhesive power of the treated layer.

(3) Wiping Property of Pressure-Sensitive Adhesive

A surface of a cut section of the above-mentioned pressure sensitive pressure-sensitive adhesive sheet was rubbed on a treated layer of the protective tape used for optical member to force the pressure-sensitive adhesive was to be adhered on the treated layer in a linear shape. Subsequently, the pressure-sensitive adhesive on the treated layer was wiped off twice round trip using KIMWIPE (manufactured by CRECIA Corporation, registered trademark) with a pressure of about 1 N/cm$^2$ to evaluate removability of the pressure-sensitive adhesive by following criteria.

○—Pressure-sensitive adhesive separates from treated layer.
x—Pressure-sensitive adhesive does not separate from treated layer.

(4) Solvent Resistance

A treated layer of an protective tape used for optical member was wiped off 5 times round trip using KIMWIPE (manufactured by CRECIA Corporation, registered trademark) including ethyl acetate impregnated, with a pressure of about 1 N/cm² to evaluate removability of the pressure-sensitive adhesive by following criteria.
  ○—Treated layer is not removed at all, excellent.
  x—Treated layer is markedly removed.

(5) Pick up property of protective tape used for optical member by cellophane pressure-sensitive adhesive tape A protective tape used for optical member was attached on a polarizing plate, and left it alone for 24 hours. Subsequently, immediately after a cellophane pressure-sensitive adhesive tape No. 29 by NITTO DENKO CORP. was attached on a treated layer of an protective tape used for optical member on a corner of the polarizing plate, the cellophane pressure-sensitive adhesive tape was vertically drawn up, and it was evaluated whether the protective tape used for optical member was released from the polarizing plate, by following criteria.
  ○—Protective tape used for optical member released
  x—Protective tape used for optical member not released

TABLE 1

| | Printing property | | Adhesive power of treated layer | Wiping property of pressure-sensitive adhesive | Solvent resistance of treated layer | Pickup property |
|---|---|---|---|---|---|---|
| | Stamping | Ink jet | (N/50 mm) | | | |
| Example 1 | 5 | 5 | 1.2 | ○ | ○ | ○ |
| Comparative example 1 | 5 | 5 | 1.0 | ○ | x | ○ |
| Comparative example 2 | 1 | 2 | 0.5 | ○ | x | ○ |
| Comparative example 3 | 5 | 5 | 28.5 | x | — | ○ |

What is claimed is:

1. A protective tape used for an optical member, comprising:
   a plastic film base;
   a pressure-sensitive adhesive layer formed on one side of the plastic film base; and
   a treated layer formed on an opposite side of the plastic film base and having a structure in which a copolymer (A) constituted by
   (a) an alkyl (meth)acrylate having an alkyl group with carbon numbers of 8 to 20;
   (b) (meth)acrylonitrile; and
   (c) a monomer having functional groups copolymerized with the components (a) and (b), wherein the components (a), (b), and (c) are copolymer constituents,
   is further cross-linked by a cross-linking agent having at least two functional groups having reactivity with functional groups present in the monomer to form a cross-link structure.

2. The protective tape of claim 1, wherein the monomer includes carboxyl groups.

3. The protective tape of claim 2, wherein the cross-linking agent is selected from the group consisting of polyisocyanate compounds, polyamine compounds, melamine resins, urea resins, and epoxy resins.

4. The protective tape used for an optical member: comprising a plastic film base, a pressure-sensitive adhesive layer formed on one side of the plastic film base and a treated layer formed on an opposite side of the plastic film base, wherein the treated layer has a structure in which a copolymer (A) including
   (a) an alkyl (meth)acrylate having an alkyl group with carbon numbers of 8 to 20;
   (b) (meth)acrylonitrile; and
   (c) a monomer having functional groups copolymerizable with the component (a) and the component (b), wherein the components (a), (b), and (c) are copolymerization components,
is cross-linked by a cross-linking agent, wherein the molar ratio of (alkyl (meth)acrylate/(meth)acrylonitrile is from 10/90 to 20/80.

5. The protective tape used for an optical member: comprising a plastic film base, a pressure-sensitive adhesive layer formed on one side of the plastic film base and a treated layer formed on an opposite side of the plastic film base,
   wherein the treated layer has a structure in which a copolymer (A) including
   (a) an alkyl (meth)acrylate having an alkyl group with carbon numbers of 8 to 20;
   (b) (meth)acrylonitrile; and
   (c) a monomer having functional groups copolymerizable with the component (a) and the component (b), wherein the components (a), (b), and (c) are copolymerization components,
is cross-linked by a cross-linking agent, wherein the molar ratio of (alkyl (meth)acrylate +(meth)acrylonitrile)/monomer is from 100/20 to 100/60.

6. The protective tape used for an optical member: comprising a plastic film base, a pressure-sensitive adhesive layer formed on one side of the plastic film base and a treated layer formed on an opposite side of the plastic film base,
   wherein the treated layer has a structure in which a copolymer (A) including
   (a) an alkyl (meth)acrylate having an alkyl group with carbon numbers of 8 to 20;
   (b) (meth)acrylonitrile; and
   (c) a monomer having functional groups copolymerizable with the component (a) and the component (b), wherein the components (a), (b), and (c) are copolymerization components,
is cross-linked by a cross-linking agent, wherein the molar ratio of (alkyl (meth)acrylate +(meth)acrylonitrile)/monomer is from 100/30 to 100 50.

7. The protective tape used for an optical member: comprising a plastic film base, a pressure-sensitive adhesive layer formed on one side of the plastic film base and a treated layer formed on an opposite side of the plastic film base,
   wherein the treated layer has a structure in which a copolymer (A) including
   (a) an alkyl (meth)acrylate having an alkyl group with carbon numbers of 8 to 20;
   (b) (meth)acrylonitrile; and
   (c) a monomer having functional groups copolymerizable with the component (a) and the component (b), wherein the components (a), (b), and (c) are copolymerization components,
is cross-linked by a cross-linking agent, wherein the cross-linking agent is selected from the group consisting of polyisocyanate compound, polyamine compound, melamine resin, urea resin, and epoxy resin.

* * * * *

UNITED STATES PATENT AND TRADEMARK OFFICE
CERTIFICATE OF CORRECTION

| | | |
|---|---|---|
| PATENT NO. | : 7,270,877 B2 | |
| APPLICATION NO. | : 10/763977 | |
| DATED | : September 18, 2007 | |
| INVENTOR(S) | : Takuya Niino et al. | |

It is certified that error appears in the above-identified patent and that said Letters Patent is hereby corrected as shown below:

Column 2, line 47, After "by" insert -- a --.

Column 2, line 48, After "below," insert -- leading --.

Column 2, line 48, After "invention" insert -- . --.

Column 3, line 9, Delete "acrylonitrilec" and insert -- acrylonitrile --, therefor.

Column 3, line 44, Delete "indentfication" and insert -- identification --, therefor.

Column 3, line 53, Delete "Morever" and insert -- Moreover --, therefor.

Column 4, line 17, After "2," delete "base" and insert -- bases --, therefor.

Column 4, line 17, Delete "ued" and insert -- used --, therefor.

Column 4, line 18, Delete "use" and insert -- used--, therefor.

Column 4, line 19, Delete "opecial" and insert -- special --, therefor.

Column 4, line 22, After "films" insert -- , --.

Column 4, line 23, Delete "esins" and insert -- resins --, therefor.

Column 4, line 23, After "sulfone based resins," insert -- polycarbonate based resins, polyamide based resins, --.

Column 4, line 24, Delete "polyokefin" and insert -- polyolefin --, therefor.

Column 4, line 25-26, Delete ".Amonfg them, polyester based resins are polyolefin based resins, and acrylic based resins." and insert -- resins. --, therefor.

Column 4, line 51, Delete "icosyl" and insert -- eicosyl --, therefor.

Column 4, line 51, After "used" insert -- independently --.

UNITED STATES PATENT AND TRADEMARK OFFICE
CERTIFICATE OF CORRECTION

| | |
|---|---|
| PATENT NO. | : 7,270,877 B2 |
| APPLICATION NO. | : 10/763977 |
| DATED | : September 18, 2007 |
| INVENTOR(S) | : Takuya Niino et al. |

It is certified that error appears in the above-identified patent and that said Letters Patent is hereby corrected as shown below:

Column 5, line 9, After "needed" insert -- , --.

Column 5, line 11, After "of" delete "the pressure".

Column 6, line 25, Delete "th" and insert -- the --, therefor.

Column 6, line 26, Delete "th" and insert -- the --, therefor.

Column 6, line 53, Delete "referenc" and insert -- reference --, therefor.

Column 7, line 25, Delete "th etreated" and insert -- the treated --, therefor.

Column 7, line 28, Delete "sensitiove" and insert -- sensitive --, therefor.

Column 7, line 47, Delete "wight" and insert -- weight --, therefor.

Column 8, line 1, Before "Evaluation" insert -- ( --.

Column 8, line 1, After "Method" insert -- ) --.

Column 8, line 19, delete "polimer" and insert -- polymer --, therefor.

Column 8, line 19, Delete "acryl" and insert -- acrylic --, therefor.

Column 8, line 44-48, Delete "5) The sample was kept to stand for 30 minutes after attached, and subsequently, the protective tap used for optical member was 180-degree peeled at rate of 0.3 m/minute to obtain and adhesive power of the treated layer."

Column 8, line 45, Insert -- 5) The sample was kept to stand for 30 minutes after attached, and subsequently, the protective tap used for optical member was 180-degree peeled at rate of 0.3 m/minute to obtain and adhesive power of the treated layer.-- as a new paragraph.

UNITED STATES PATENT AND TRADEMARK OFFICE
CERTIFICATE OF CORRECTION

PATENT NO.        : 7,270,877 B2
APPLICATION NO.   : 10/763977
DATED             : September 18, 2007
INVENTOR(S)       : Takuya Niino et al.

It is certified that error appears in the above-identified patent and that said Letters Patent is hereby corrected as shown below:

Column 9, line 9, After "tape" insert -- . --.

Column 9, line 63, In Claim 4, delete "The" and insert -- A --, therefor.

Column 10, line 12, In Claim 4, delete "(alkyl" and insert -- alkyl --, therefor.

Column 10, line 14, In Claim 5, delete "The" and insert -- A --, therefor.

Column 10, line 24, In Claim 5, after "(b)" delete "." and insert -- , --, therefor.

Column 10, line 30, In Claim 6, delete "The" and insert -- A --, therefor.

Column 10, line 46, In Claim 6, delete "100 50" and insert -- 100/50 --, therefor.

Column 10, line 47, In Claim 7, delete "The" and insert -- A --, therefor.

Signed and Sealed this

Seventeenth Day of June, 2008

JON W. DUDAS
*Director of the United States Patent and Trademark Office*